Oct. 24, 1933. C. H. ROLLASON Re. 18,982

SHEET METAL CONTAINER AND HEAD THEREFOR

Original Filed Oct. 27, 1930

INVENTOR

Charles H. Rollason by Byrne, Stebbins, Pennie & Blum his attorneys

Reissued Oct. 24, 1933 Re. 18,982

UNITED STATES PATENT OFFICE 18,982

SHEET METAL CONTAINER AND HEAD THEREFOR

Charles H. Rollason, Wheeling, W. Va., assignor to Wheeling Steel Corporation, Wheeling, W. Va., a corporation of Delaware Original No. 1,903,300, dated April 4, 1933, Serial No. 491,358, October 27, 1930. Application for reissue June 17, 1933. Serial No. 676,407

11 Claims. (Cl. 221—11)

This invention relates broadly to sheet metal containers, and more particularly to a drum or can of the character employed as containers for oils and other fluids and having a spout through which the fluid contents are introduced and removed.

An object of the invention is to provide a container or can of drum form embodying a head having a pouring spout formed thereon and so located that drip therefrom following pouring of contents cannot overrun any material portion of the surface of said head, thus obviating a serious objection to common forms of containers of this type.

A further object is to provide a container head of the character mentioned wherein the pouring spout occupies a sunken position relative to the general plane of the head and is located closely adjacent to the circumferential edge portion of said head, thereby to permit free drainage from the head of such of the fluid contents as may drip from said spout during and following pouring.

Another object is to provide a container adapted for nesting or stacking and having at its upper portion a pouring opening or spout and which has an "outage" space extending substantially to the top of the container.

In describing the invention in detail, reference is herein had to the accompanying drawing, in which Figure 1 is a top plan view of a container embodying my invention;

Figure 1:
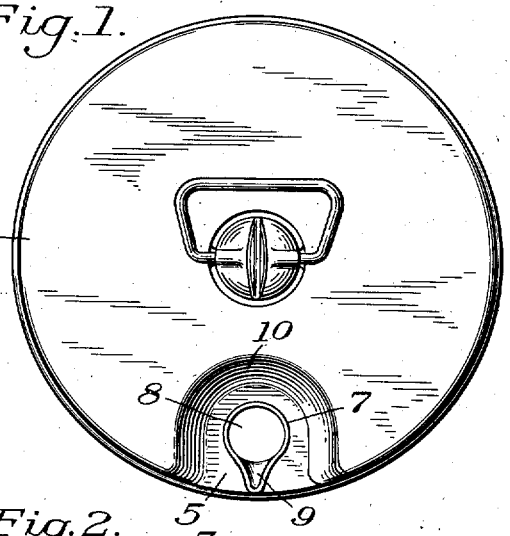
Figure 2:
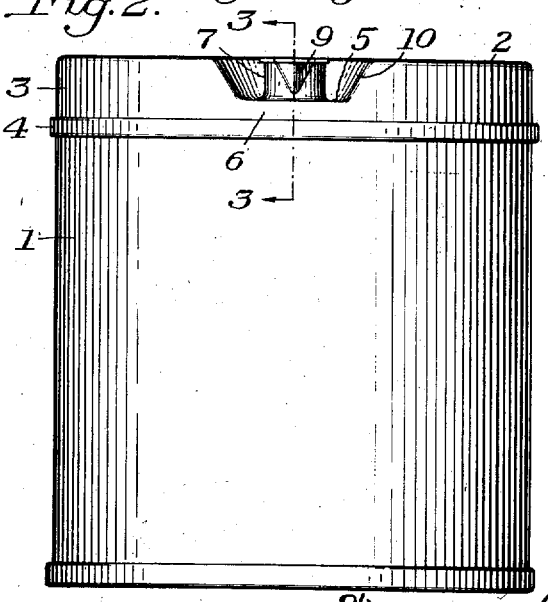
Figure 2 is a side elevation of the same.

Referring to said drawing, 1 designates the body of a sheet metal drum, can or pail, and 2 the head end thereof, the latter being of diepressed or drawn form and having an annular depending flange 3 permanently attached to the end of said body, as by an annular seam 4.

Formed in said head 2 adjacent to its outer edge is a relatively depressed, or sunken, area 5, herein shown as having an approximately circular contour as viewed from above, or in top plan, which at one side opens outwardly through said outer edge and which, consequently, materially reduces the height of the flange 3 at said edge, as shown at 6. Provided on said sunken area 5, preferably in a substantially central location, is an upright neck 7 defining an opening 8 through which the contents of the container may be removed by pouring. Said neck, constituting a pouring spout, has at its outer side a suitably flared non-vertical or overhung lip 9 whereby the direction of flow in pouring may be more or less controlled and which projects to or adjacent to, but not beyond, the peripheral line, projected, of the underlying portion 6 of the flange 3.

The sunken area 5, which, together with the spout 7, is preferably formed by a metal drawing process well understood in the art, encircles said spout, as shown, and is defined by an inclined wall 10.

Figure 4:
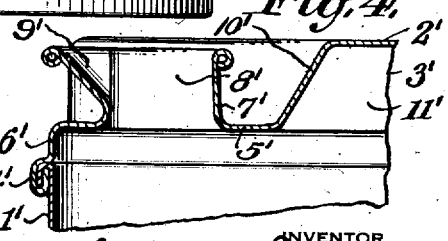
Figure 4 is a view similar to Figure 3 showing a modified construction.
Figure 3:
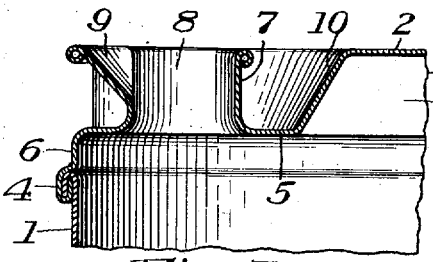
Figure 3 is an enlarged detail section on line 3—3, Fig. 2.

The pouring spout 7, which is preferably integral with the head 2, has its upper, or terminal, edge located on a level in or below the general plane of the surface of said head, thereby to avoid all interference from said spout in stacking containers in the usual way. In Figure 4, in which the parts corresponding with the parts shown in Figure 3 are designated with like reference numerals having primes affixed, there is illustrated a container in which the pouring spout 7′ has its upper, or terminal, edge located below the general plane of the surface of the head 2′.

An "outage" space 11 is provided which extends substantially to the top of the container and preferably at least substantially to the top of the spout. Provision is thus made for stacking the containers without substantial interference by the spout and without the necessity of providing an upwardly extending rim to clear the spout, thereby decreasing the amount of material in the container relative to its volume and consequently decreasing the cost of a container of any given capacity.

As is manifest, any fluid which may overflow or drip from the spout will readily drain to the sunken area 5 which, in effect, constitutes a spout encircling channel that opens outwardly over the edge of the head for draining off such overflow.

What is claimed is—

1. A container of the character described comprising a head having therein adjacent to and opening outward through its peripheral edge portion a sunken area, an upright pouring spout located within said area adjacent to said edge portion, the spout encircling portion of said area constituting a drainage channel for receiving and conducting away from said head overflow from said spout, and means below the plane of the bottom of said spout for securing the head to the container.

2. A container of the character described comprising a rimless head having therein a sunken area which at one side opens outwardly through an edge portion of said head, said area having therein a pouring opening, the opening-encircling portion of said area constituting a channel for receiving and for draining from said head overflow or drippings from said opening, and means below the plane of the bottom of said spout for securing the head to the container.

3. A sheet metal container of the character described comprising a body, a head having a downwardly directed annular flange attached to the upper end of said body, said head having therein adjacent to and opening outward through its peripheral edge a relatively depressed area, and a pouring opening located within said area, the opening encircling portion of said area constituting a drainage channel for receiving and conducting away from said head overflow and drippings from said opening.

4. A sheet metal container of the character described comprising a body, a head having a downwardly directed annular flange attached to the upper end of said body, said head having therein adjacent to and opening outward through its peripheral edge a relatively depressed area, and a pouring spout of less height than the depth of the depression at said depressed area located within said area and adjacent said edge.

5. A container having a top and pouring means having a portion extending above a portion of said top, there being a portion of the container extending at all times at least substantially as high as the top of the pouring means and forming at least a portion of the topmost surface of the container, whereby to provide both an outage space and a top stacking surface.

6. A container comprising a top having a sealing portion adapted for cooperation with the body of the container to seal the same and pouring means having a portion extending above a portion of said top, said top having another portion extending at least substantially as high as the top of the pouring means and above said sealing portion and providing both an outage space and a top stacking surface.

7. A container comprising a top having pouring means including a non-vertical pouring lip at its upper portion and having a sealing portion adapted for cooperation with the body of the container to seal the same, said container having a wall portion extending generally upwardly to a level at least substantially as high as the top of the pouring means and above said sealing portion to provide a top stacking surface and then extending generally inwardly toward the axis of the container substantially at a level above the bottom of the pouring means to provide an outage space.

8. A container comprising a metal top having pouring means associated therewith and having a portion adapted for cooperation with the body of the container to seal the same, there being a portion of the container extending at least substantially as high as the top of the pouring means and above said sealing portion and providing both an outage space and a top stacking surface.

9. As an article of manufacture, a receptacle comprising a closure having a sealing portion adapted for cooperation with the body of the container to seal the same, said closure having a depression formed therein and being provided with a pouring opening having a pouring lip the pouring plane of which is above the plane of the bottom of the depression and below the plane of the main body of the closure, the plane of the main body of the closure being above the plane of the sealing portion.

10. As an article of manufacture, a receptacle comprising a closure having a sealing portion adapted for cooperation with the body of the container to seal the same, said closure having a depression formed therein and being provided with a pouring spout the pouring plane of which is above the plane of the bottom of the depression and below the plane of the main body of the closure, the plane of the main body of the closure being above the plane of the sealing portion.

11. As an article of manufacture, a closure comprising a sealing rim, a main body projecting above the plane of said rim, there being a depression in said body opening through the outer edge thereof, and a pouring spout projecting upwardly from the bottom of said depression.

CHARLES H. ROLLASON.